United States Patent
Sivertsen

(12) 
(10) Patent No.: US 6,836,092 B2
(45) Date of Patent: Dec. 28, 2004

(54) METHODS AND CIRCUITS FOR DETECTING OPERATIONAL INFORMATION OF DC FANS

(75) Inventor: Clas G. Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 10/383,088

(22) Filed: Mar. 6, 2003

(65) Prior Publication Data

US 2004/0174131 A1 Sep. 9, 2004

(51) Int. Cl.$^7$ ................................................ G05B 1/06
(52) U.S. Cl. .................... 318/639; 318/459; 318/500; 388/928.1; 323/234
(58) Field of Search ............................ 318/689, 459, 318/500; 388/928.1; 323/234

(56) References Cited

U.S. PATENT DOCUMENTS

| | | | | |
|---|---|---|---|---|
| 4,413,213 A | * | 11/1983 | Baumgarten, Jr. | 388/814 |
| 5,197,858 A | * | 3/1993 | Cheng | 417/14 |
| 5,747,833 A | * | 5/1998 | Fujisaki et al. | 318/808 |
| 5,926,386 A | * | 7/1999 | Ott et al. | 700/70 |
| 6,091,887 A | * | 7/2000 | Dieterle et al. | 388/811 |
| 6,392,372 B1 | * | 5/2002 | Mays, II | 318/254 |
| 6,470,289 B1 | * | 10/2002 | Peters et al. | 702/132 |
| 6,650,072 B2 | * | 11/2003 | Harlan | 318/254 |

* cited by examiner

*Primary Examiner*—Rita Leykin
(74) *Attorney, Agent, or Firm*—Merchant & Gould

(57) ABSTRACT

Methods and circuits detect operational information about DC fans powered by pulse width modulation, such as detecting fan presence in a device and/or detecting rotational speed. Output pulses produced by the fan related to the rotational speed are utilized to produce temporary reductions of voltage at the input of a control circuit. The control circuit may count the temporary reductions per unit of time to detect the speed. A pull down resistor may be coupled to the input to pull the input to a continuously low voltage when the DC fan is not present to otherwise provide a pull up at the input, and the control circuit may detect a missing fan from the continuously low voltage. Additionally, or alternatively, a secondary voltage may be provided to the DC fan in addition to the pulse width modulation while a consistently high voltage is provided to the input of the control circuit. Accordingly, the DC fan continues to produce output pulses indicative of speed during the low state of the pulse width modulation, which enables the control circuit to continue to receive the temporary reductions at the input to determine the rotational speed with accuracy.

30 Claims, 3 Drawing Sheets

METHODS AND CIRCUITS FOR DETECTING OPERATIONAL INFORMATION OF DC FANS

TECHNICAL FIELD

The present invention is related to direct current ("DC") fans used in various devices. More particularly, the present invention is related to the detection of operational information of the DC fans such as the presence and/or rotational speed of the DC fan within a device.

BACKGROUND

Various devices utilize DC fans for purposes such as cooling components to prevent overheating. Computers are an example of a device that may utilize one or more DC fans to cool the components of the computer, such as a bank of hard drives. LCD projectors are another example, wherein the light bulb of the LCD must be cooled to prevent failure. The cooling from the DC fan is often critical to the continued operation of the device being cooled, so the DC fan must often be monitored for proper operation to prevent DC fan failure which would otherwise cause failure of the device itself.

To extend the life of the DC fan, a pulse width modulated voltage is typically applied rather than a continuous DC voltage. The pulse width modulated voltage provides a peak voltage for each pulse that is great enough to maintain an adequate rotational speed of the fan, but the pulses reduce the increased strain on the fan that otherwise results from operating with a constant voltage. A controller is often employed to monitor the rotational speed of the DC fan resulting from the pulse width modulation and adjust the duty cycle as necessary to ensure that the DC fan continues to adequately perform.

The controller includes an input that is pulled to a high voltage via a pull up resistor linked to a power supply voltage. In DC fans where the pull up resistor is internal to the fan, the pulse width modulated input to the DC fan is applied to the pull up resistor to pull up the voltage at the input of the controller. Where the pull up resistor is external to the DC fan, the pulse width modulated input to the DC fan or a separate voltage source may be applied to the pull up resistor to pull up the voltage at the input. The input is further connected to a transistor, typically internal to the fan, that is switched on and off by rotation of the fan, such as through the output pulse from a Hall effect sensor powered by the pulse width modulated input voltage to the fan. This on and off switching results in temporary reductions of the pulse width modulated voltage being received at the input and these temporary reductions are counted to detect the rotational speed of the fan.

The DC fans may be removable from the device. For example, a DC fan may fail and may need to be replaced or repaired. However, it is important to know when a DC fan is not present in a device so that harm due to overheating can be prevented. Where multiple DC fans are present, it is also important to know that one or more fans are not present since the remaining fans may not be able to provide sufficient cooling and because the duty cycle of the pulse width modulated voltage for the remaining fans will increase or even result in a constant voltage to allow the remaining fans to compensate for the missing fan(s). Thus, it is important that missing fans be replaced before a device is used or as soon as possible after the fan is removed.

Because for some DC fans the input to the control circuit is pulled up by the presence of the pull up resistor that is integral to the fan, when the fan is removed from the device then the input is no longer pulled up. This results in the input to the control circuit floating, or having no definite logical high or low value. This prevents the control circuit from detecting whether the fan is missing or present. Therefore, other cumbersome methods of detecting whether the fan is missing or not must be used, such as manual inspections of the devices prior to the devices being used.

In addition to detecting the presence of a fan, it is important to detect the rotational speed of the fan so that its performance can be evaluated to determine whether maintenance or replacement is necessary. The speed of the fan is detected from the temporary reductions in the voltage pulled up at the input that are proportional to speed, but these temporary reductions can only be detected during the period of time that the pulse width modulated voltage is at the high state. This limited time of detection of temporary reductions is due to the rotation sensor integral to the DC fan requiring power from the power supply for the fan to accurately produce a pulse that results in the temporary reduction at the input to the control circuit, but no power is provided during the low state of the pulse width modulated voltage thereby limiting the time of accurate detection. For DC fans where the pull up is powered by the pulse width modulated voltage, then this limited time of accurate detection of temporary reductions is also due to no pull up voltage being present during the period when the pulse width modulated voltage is at the low state.

The output pulse train resulting in the temporary reductions that enables the control circuit to detect rotational speed is asynchronous relative to the pulse train of the pulse width modulated power supply. Due to this asynchronous relationship, erratic measurements result because during one high period of the pulse width modulation, there may be few if any output pulses while during another high period there may be several output pulses. These erratic measurements are not effective in monitoring the rotational speed of the fan since they are inaccurate. Additionally, during the low periods of the pulse width modulation occurring during an output pulse, the rotational sensor may produce residual noise that appears as temporary reductions at the input to the control circuit since the sensor may be producing an output pulse which is briefly terminated by the low state of the pulse width modulation and which results in multiple temporary reductions rather than only one. This causes the input to the control circuit to detect a speed reading that is too high.

Thus, other methods of attempting to accurately detect fan speed are used. One technique is to apply a continuous voltage from the pulse width modulated power supply for a period of time when speed will be measured, so that the input is continuously pulled up, the rotation sensor is continuously powered, and the temporary reductions resulting from the output pulse may be measured consistently. However, such periodic application of continuous voltage from the pulse width modulated power source has significant drawbacks as well. This method is likely to be harmful to the fan, it results in audible noise that is distracting due to the variation in fan speed, and it also results in inaccuracy because the DC fan speed is higher and less constant for the measurement period than it is during the normal operating period.

SUMMARY

Embodiments of the present invention address these and other issues by providing methods and circuits that detect whether the fan is present through the input of the control circuit and that measure rotational speed at the input of the control circuit during both the high and low states of the pulse width modulated voltage. In certain embodiments, a pull down resistor may be provided at the input of the control circuit to provide a continuously low voltage indicative of a missing fan. In certain embodiments, a secondary voltage may be provided to the fan to power the rotation sensor, and pull up the input if applicable, during the low state of the pulse width modulated voltage to allow temporary reductions indicative of rotational speed to be detected at all times without altering the duty cycle of the pulse width modulated voltage.

One embodiment is a method of detecting operational information about a DC fan of a device where the DC fan is powered by pulse width modulation and produces an output pulse in proportion to rotational speed. The method involves providing a pulse width modulated voltage to the DC fan and providing a voltage to an input of a control circuit when the DC fan is present in the device. A temporary reduction in the voltage to the input of the control circuit is produced upon receiving the output pulse from the DC fan when present. The input of the control circuit is held at a low voltage when the DC fan is not present. It is detected through the control circuit that the DC fan is not present in the device when the input of the control circuit is continuously at the low voltage. The rotational speed of the DC fan when present in the device is detected through the control circuit from the number of temporary reductions in the voltage per unit of time at the input of the control circuit.

Another embodiment is a method of detecting operational information about a DC fan of a device where the DC fan is powered by pulse width modulation and produces an output pulse in proportion to rotational speed. The method involves providing a pulse width modulated voltage and a secondary voltage to the DC fan. A voltage is provided to the input of the control circuit. A temporary reduction in the voltage to the input of the control circuit is produced upon receiving the output pulse from the DC fan during each period of time that the pulse width modulated voltage is high and during each period of time that the pulse width modulated voltage is low. The rotational speed of the DC fan is detected through the control circuit from the number of temporary reductions per unit of time of the voltage at the input of the control circuit.

Another embodiment is a circuit for detecting operational information about a DC fan of a device where the DC fan is powered by pulse width modulation and produces an output pulse in proportion to rotational speed. The circuit includes a transistor operatively coupled to receive the output pulse and a controller having an input joined at a node with an electrode of the transistor. The controller is configured to detect the presence of the fan based on the input receiving a continuously low voltage or other voltage. A pull up resistor is electrically connected to the node and provides a voltage drop to the input upon the transistor conducting in response to the output pulse. A pulse width modulated power supply is electrically connected to the DC fan and a voltage source is electrically connected to the pull up resistor opposite the node. A pull down resistor is electrically connected between the node and ground and provides the continuously low voltage at the input upon the pull up resistor being disconnected from the node.

Another embodiment is a circuit for detecting operational information about a DC fan of a device where the DC fan is powered by pulse width modulation and produces an output pulse in proportion to rotational speed. The circuit includes a transistor operatively coupled to receive the output pulse and a controller having an input joined at a node with an electrode of the transistor. The controller is configured to detect the speed of the fan based on the input receiving voltage having temporary reductions corresponding to the output pulse during periods when the pulse width modulated voltage is high and low. A pull up resistor is electrically connected to the node and provides a voltage drop to the input to provide the temporary reduction upon the transistor conducting in response to the output pulse. A pulse width modulated power supply is electrically connected to the DC fan and a voltage source is electrically connected to the pull up resistor opposite the node. A secondary voltage supply is also electrically coupled to the DC fan and provides a secondary voltage that is less than the pulse width modulated voltage when high.

DETAILED DESCRIPTION

Various embodiments of the present invention described herein provide circuitry for detecting the presence of a DC fan where the DC fan utilizes an internal pull-up resistor that is removed from the circuit upon the DC fan being removed from the device. Additionally, various embodiments of the present invention described herein provide circuitry for more accurately detecting the rotational speed of the DC fan, including DC fans with an internal pull up resistor and DC fans with external pull up resistors.

Figure 1:
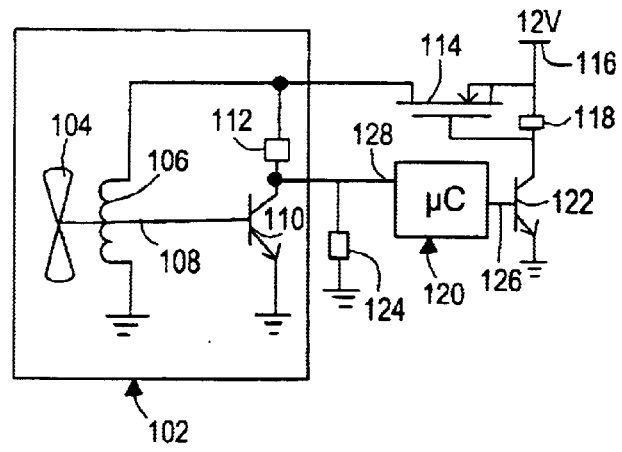
FIG. 1 shows a DC fan with an internal pull up resistor and a circuit coupled to the fan for detecting fan presence and rotational speed.

FIG. 1 shows a DC fan 102 that includes a propeller 104 driven by a DC motor coil 106. A sensor 108 at the coil, such as a Hall effect sensor, receives power from the power supply powering the coil 106 and produces an output pulse each time the sensor crosses paths with a magnetic pole of the DC fan (not shown). This output pulse is therefore proportional to the rotational speed of the fan 102, and the speed can be determined by knowing the number of magnetic poles, and therefore the number of output pulses that occur for each revolution of the fan 102.

In this embodiment, to provide reliable speed measurement, the sensor 108 sends the output pulse to the base of a bi-polar transistor 110 to momentarily switch the transistor 110 on. The transistor 110 is in an open collector configuration, as the collector has a high resistance load from the input 128 of a microcontroller 120. The input 128 is pulled up to a voltage by a pull up resistor 112 internal to the fan 102. The pull up resistor 112 may receive the same input voltage as the coil 106 in some embodiments or may be decreased through a voltage divider (not shown) to reduce the voltage at the pull up. Accordingly, the node interconnecting the pull up resistor, collector of the transistor 110, and input 128 of the controller 120 is pulled up to the voltage being input to the fan 102, or a reduced voltage where a voltage divider is present, when the transistor 110 is off. Upon the transistor 110 being switched on momentarily by the output pulse biasing the transistor 110 toward saturation, current is drawn from the input power source of the fan 102 through the pull up resistor 112 and transistor 110 to cause the collector voltage, which is the voltage at the input 128 of the controller 120, to drop to a typically logical low value near zero.

This momentary drop to nearly zero is seen as a temporary reduction in the input voltage at input 128 by the microcontroller 120. This temporary reduction is counted at the microcontroller 120 for a particular unit of time to provide an indication of the rotational speed of the DC fan 102. However, because a pulse width modulated voltage is provided to the fan 102 as the input voltage, the input 128 is pulled up to the pulse width modulation voltage which is asynchronous relative to the output pulses. For example, the sensor 108 may be passing magnetic poles that would otherwise generate multiple output pulses during the low state of the pulse width modulated supply. This results in the input 128 not receiving the proper number of temporary reductions since the input 128 receives the one reduction, which is the low state of the pulse width modulation and which is likely to be different than the number of output pulses that should be counted during that low state period. This inaccuracy is illustrated in FIG. 4, which is discussed in more detail below.

The pulse width modulated power supply includes a field effect transistor 114 ("FET") having a source connected to a voltage source 116 with a voltage (e.g. 12V for a 12V fan) great enough to cause rotation of the fan 102. A bias resistor 118 is connected between the source and the gate of the FET 114, and the gate and resistor 118 are further connected to a collector of a bi-polar transistor 122. The microcontroller 126 has a pulse width modulated output 126 that feeds the base of the transistor 122 to turn it off and on according to the desired pulse width modulation scheme. When the transistor 122 is turned on, current is drawn through the resistor 118 to create a voltage difference between the source and the gate of the FET 114 which results in the FET 114 turning on to provide the pulse width modulation. This pulse width modulated voltage provided to the fan 102 has a peak voltage and current supplied by the source 116 rather than from the output 126, which is typically unable to provide the necessary power to the fan 102.

Although this circuit of FIG. 1 may not accurately detect the rotational speed of the fan 102 without altering the duty cycle or providing some other firmware based solution, this circuit of FIG. 1 does provide an accurate indication of whether the fan 102 is present or not within a device. As discussed, the pull up resistor 112 is internal to the fan 102, so when the fan 102 is removed then the pull up resistor 112 is also removed. This results in the voltage at the input 128 being pulled to a logical low value by a pull down resistor 124. This pull down resistor 124 is connected between the input 128 and a logical low voltage, such as system ground. Thus, when the fan 102 is removed, rather than floating, the input 128 is pulled down to a continuously low value such that the microcontroller 120 detects the continuously low voltage indicating that the fan 102 is not present. This pull down resistor 124 may be orders of magnitude greater in resistance than the pull up resistor 112, such as two orders greater so that when the fan 102 is present the pull down resistor 124 draws relatively little additional current from the voltage source 116.

Figure 4:
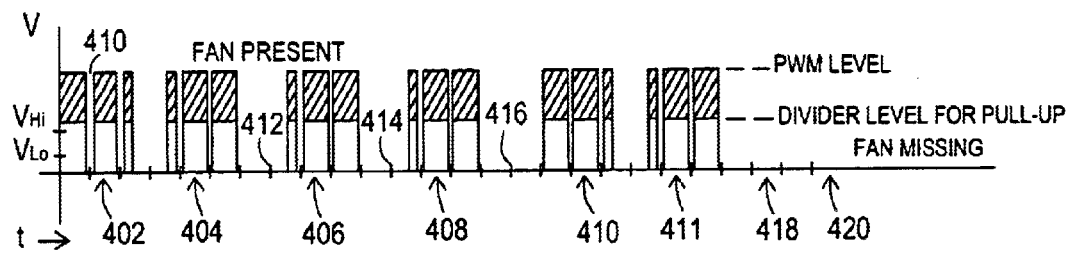
FIG. 4 is a graph of the signal received at the input of a controller according to the circuitry of FIG. 1 to detect fan presence and rotational speed.

FIG. 4 illustrates the signal received at input 128. The input 128 is pulled up to the pulse width modulation ("PWM") level. As shown, six separate pulses 402, 404, 406, 408, 410, and 411 of the pulse width modulation have been provided while the fan 102 is present. Because the voltage at the input 128 is fluctuating from below $V_{Lo}$ (logical low; e.g. 0.8V) to above $V_{Hi}$ (logical high; e.g. 2.5V), the microcontroller 120 detects that the fan 102 is present. However, after the sixth pulse 411, the fan 102 is removed such that the pull down resistor 124 pulls the input 128 to a continuously low value, below $V_{Lo}$. Upon the microcontroller 120 detecting that the voltage has not returned to above $V_{Hi}$ after a predefined period, such as after two periods 418 and 420 of the PWM input, then the microcontroller 120 detects that the fan 102 is not present, and may provide some indication such as a blinking LED or other signal.

Figure 2:
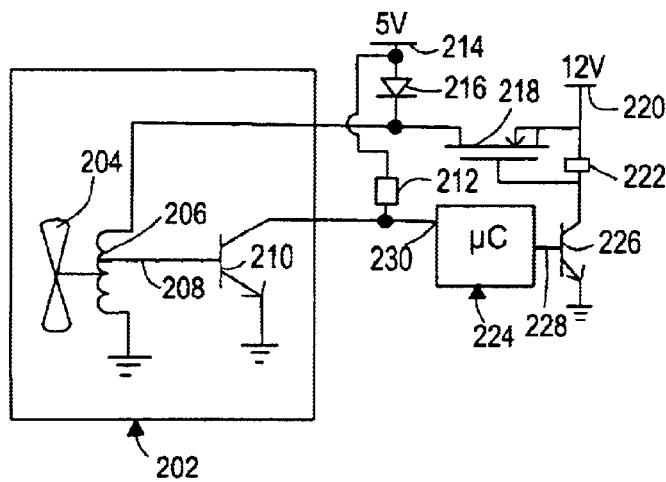
FIG. 2 shows a DC fan with an external pull up resistor and a circuit coupled to the fan for more accurately detecting rotational speed without requiring an adjustment to the duty cycle.

FIG. 2 illustrates a circuit that more accurately detects the rotational speed of a fan 202. The fan 202 includes a propeller 204 driven by a coil 206 having a rotational sensor 208 that produces output pulses in proportion to rotational speed. A transistor 210 is switched on by the output pulse. In this embodiment, the fan 202 has an external pull up resistor 212. This pull up resistor 212 is connected to a secondary voltage output from a secondary voltage source 214. As another alternative, the pull up resistor 212 may be connected to another voltage source (not shown) besides the secondary voltage source 214.

The secondary voltage source 214 also provides a voltage through the diode 216 to the input to the fan 202 in parallel with the voltage from the pulse width modulation supply. The secondary voltage source 214 provides an output voltage (e.g. 5V for a 12V fan) that is sufficiently small so that it does not provide sufficient voltage to significantly impact rotation of the fan 202 such that the duty cycle approach to increasing motor life is not undermined. The output voltage of the secondary source 214 is sufficiently great to power the sensor 208 so that output pulses may continue to be generated even while the pulse width modulated voltage is at a low state. Where the secondary voltage source 214 is being used to provide the pull up voltage for the input 230, then the secondary voltage is great enough to be recognized as a logical high by the microcontroller 224. If another voltage source is providing the pull up voltage for input 230, then this other voltage must also be great enough to be recognized as a logical high by the microcontroller 224. This allows the microcontroller 224 to detect temporary reductions, such as going from logical high to logical low, at the input 230 so that the rotational speed can be detected from counting the number of temporary reductions per unit of time.

To provide the pulse width modulation to the fan 202, a voltage source 220 with a voltage capable of rotating the fan 202 is provided to a FET 218, and a bias resistor 222 between the source and gate of the FET 218 is included in conjunction with the bi-polar transistor 226 so that when the transistor 226 is on, the FET 218 is turned on to provide a pulse of voltage to the fan 202. The transistor 226 is switched on by a pulse width modulated output 228 of the microcontroller 224. The high state of the pulse width modulation is greater than that of the secondary voltage source 214, but the secondary voltage source 214 is electrically isolated from the high state of the pulse width modulation voltage by the diode 216.

Figure 7:
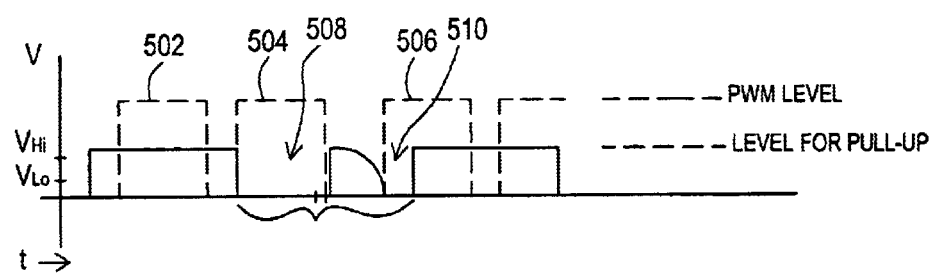
FIG. 7 is a graph of the signal received at the input of a controller according to prior art circuitry or the circuitry of FIG. 4 where residual noise results in inaccurate rotational speed detection.

In addition to providing the secondary voltage to the rotation sensor so that pulses can be produced during the low states to prevent temporary reductions from being missed where the signal to the input has a higher frequency than the pulse width modulation frequency, the secondary voltage further prevents the residual noise pulses that create false output pulses where the pulse width modulation has a higher frequency than the frequency of accurate temporary reductions at the controller input. This situation is shown in FIG. 7, the pulse width modulation may have a frequency greater than the accurate number of temporary reductions that should be occurring for certain situations. The accurate points and duration for temporary reductions are indicated with a tick mark and bracket. If the pulse width modulation, shown in dashed lines as pulses 502, 504, and 506, also goes low once or more during each bracketed period, then the sensor briefly stops producing an output pulse for the low period of the PWM which results in the signal at the input briefly returning to high, as can be seen between temporary reductions 508 and 510. This brief return to high at the controller input is followed by another temporary reduction 510 resulting from the PWM going back high which causes the sensor to again produce an output pulse. The two output pulses produced by the sensor resulting in a first temporary reduction 508 and second temporary reduction 510 correspond to only a single magnetic pole (as indicated by a single tick mark) such that there is an extra output pulse which leads to an extra temporary reduction 510 at the controller input. This extra temporary reduction 510 results in the inaccurate speed reading which is too high relative to the actual speed of the fan.

Figure 8:
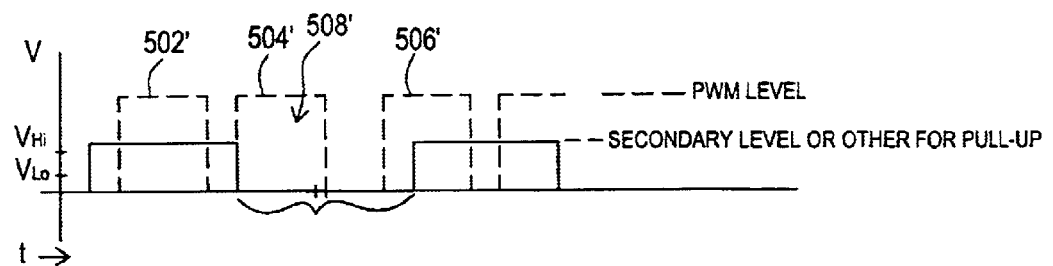
FIG. 8 is a graph of the signal received at the input of a controller according to the circuitry of FIG. 5.

As shown in FIG. 8, since the rotational sensor remains powered during the low states of the pulse width modulation between the pulses 502', 504', and 506' shown in dashed lines, the temporary reduction 508' at the controller input remains low during the entire bracketed period corresponding to one magnetic pole. Accordingly, the controller counts only a single temporary reduction 508' for this one magnetic pole which results in an accurate detection of rotational speed.

Figure 5:
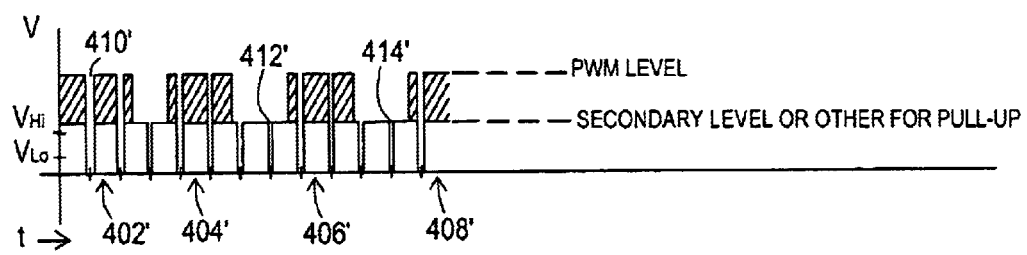
FIG. 5 is a graph of the signal received at the input of a controller according to the circuitry of FIG. 2 to more accurately detect rotational speed.

FIG. 5 illustrates the signal at the input 230 which allows the microcontroller 224 to accurately detect the rotational speed. The pulse width modulation pulses 402', 404', 406', and 408' match those of FIG. 4. FIG. 4 will be discussed in relation to FIG. 5 to further illustrate the inaccuracies of the input signal of FIG. 4 for the circuit of FIG. 1 and the lack of inaccuracies of the input signal of FIG. 5 for the circuit of FIG. 2.

As shown in FIG. 4, temporary reductions 410 are created in the input signal during the high state of the pulse width modulation. The ticks along the time axis correspond to the output pulses that are being created during the high state and that would be created during the low state except for the lack of power being provided to the rotation sensor by the circuit of FIG. 1. In this simplified example of the asynchronous relationship of the output pulse to the pulse width modulation, it can be seen that during various low states of the pulse width modulation, there are occasions where more than one output pulse should occur. For example, ticks 412, 414 and 416 are examples of a second output pulse that should be occurring within one low state. Because the microcontroller 120 can only count the low state as a single temporary reduction, the microcontroller 120 completely misses these second events indicated by ticks 412, 414, and 416, which results in the detected rotational speed being inaccurate.

As shown in FIG. 5, during the low state between the periods of high state for the pulse width modulation, the input signal is at the secondary level provided by the secondary voltage source 214 or other suitable voltage level, depending upon which alternative is providing the pull up voltage to the input 230. This voltage on the input 230 continues to be seen as a logical high by the microcontroller 224 regardless of the state of the pulse width modulation, and regardless of whether the pulse width modulation is also connected to provide a pull up to the input 230 in the alternative discussed above (excess pull up of this alternative shown in shaded area although this is likely reduced by a voltage divider for most motors and controllers). This secondary voltage level during the low state of the pulse width modulation allows the temporary reductions in the input signal due to the output pulses to be detectable by the microcontroller 224.

As shown in FIG. 5, temporary reduction 410' which occurs during the high state remains detectable. Now, temporary reductions 412' and 414' are also detectable, in addition to the other temporary reductions during the same low state periods, such that the microcontroller 224 counts every temporary reduction corresponding to every output pulse. Every occurrence of an output pulse is being generated from the sensor 208 to create a temporary reduction at the input 230, even during the low states of the pulse width modulation, since the secondary voltage continues to provide power to the sensor 208 during these low states while the input 230 continues to receive the pull up voltage that allows the temporary reductions to be detected. Furthermore, the secondary voltage source prevents the residual noise from producing false temporary reductions that further lead to inaccurate detection of speed, as illustrated in FIG. 7 for situations where the PWM has a higher frequency than the accurate frequency of temporary reductions that should be present at the controller input. Accordingly, the microcontroller 224 for the circuitry of FIG. 2 makes a more accurate detection of the rotational speed in these situations.

Figure 3:
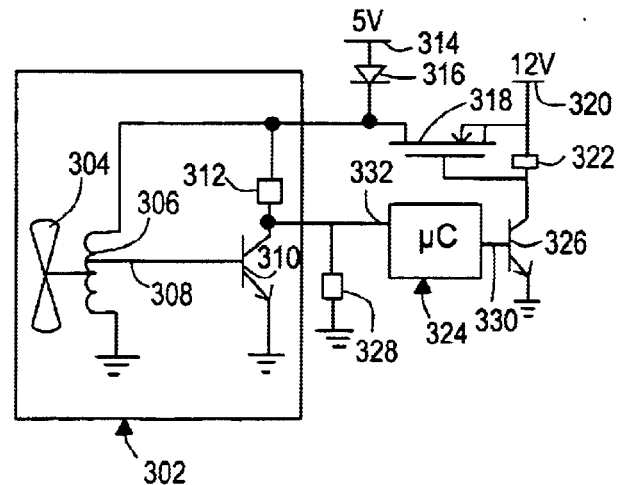
FIG. 3 shows a DC fan with an internal pull up resistor and a circuit coupled to the fan for detecting fan presence and more accurately detecting the rotational speed without requiring an adjustment to the duty cycle.

FIG. 3 illustrates a circuit that more accurately detects the rotational speed of a fan 302 and also detects the presence of the fan 302 where the fan 302 includes an internal pull up resistor 312. The fan 302 includes a propeller 304 driven by a coil 306. A rotational sensor 308 produces an output pulse to momentarily switch on a transistor 310. The collector of the transistor 310 is connected to an input 332 of a microcontroller 324, such that the pull up resistor 312 pulls up the collector and input 324 to the voltage being input to the fan 302 or a reduction of this voltage provided by a voltage divider (not shown).

So that the microcontroller 324 can detect a missing fan, a pull down resistor 328 is provided between the input 332 and a logical low voltage, such as system ground. When the fan 302 is removed, the pull up resistor 312 is no longer present to pull up the input 332 and the pull down resistor 328 pulls the input 332 down to a continuously logical low value enabling the microcontroller 324 to detect the missing fan 302. The microcontroller 324 may then provide an indication of the missing fan, such as blinking an LED.

The fan 302, when present, is provided an input voltage from two different sources. A pulse width modulated voltage is provided in parallel with a secondary voltage. The secondary voltage is provided from a secondary voltage source 314 through a diode 316. The secondary voltage is small relative to the peak of the pulse width modulation voltage such that the secondary voltage does not significantly contribute to rotation of the fan 302 during the low state of the pulse width modulation. The secondary voltage is large enough to provide power to the sensor 308 to generate an adequate output pulse and avoid production of residual noise and is also large enough to provide a logical high pull up to the input 332 through the pull up resistor 312 (and voltage divider, if present) for periods when the pulse width modulation is in the low state. The diode 316 electrically isolates the secondary voltage source 314 from the pulse width modulation.

The pulse width modulation is provided from a FET 318 that receives power from a voltage source 320. The FET 318 is switched on to provide a pulse form the voltage source 320 by current being drawn through a bias resistor 322 interconnected between the source and gate. The current is drawn through the bias resistor 322 by a transistor 326 being switched on. The microcontroller 324 provides a pulse width modulation output 330 to switch the transistor 326 on and off to thereby switch the FET 318 on and off to provide the pulse width modulated input voltage.

Figure 6:
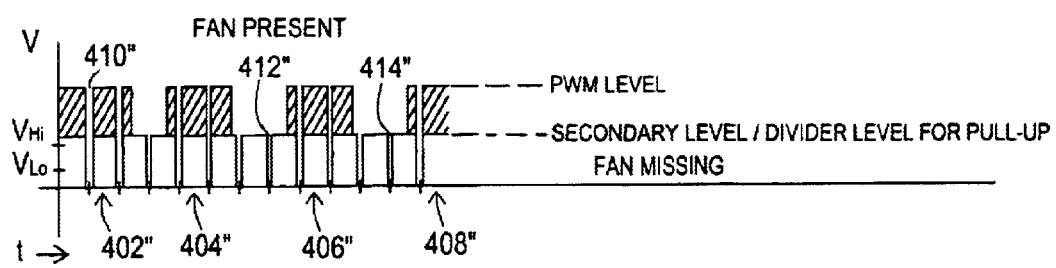
FIG. 6 is a graph of the signal received at the input of a controller according to the circuitry of FIG. 3 to detect fan presence and more accurately detect rotational speed.

FIG. 6 illustrates the input signal to the input 322 of the microcontroller 324 to allow the microcontroller 324 to more accurately detect rotational speed and also detect the presence of the fan 302. The signal to the input 322 includes pulse width modulation with high states 402", 404", 406", and 408". During these pulses when the input signal is varying between the high state and the secondary voltage, the microcontroller 332 detects that the fan 302 is present since the voltage is not continuously low. In this example, the fan 302 has been removed during the 408" pulse such that the microcontroller 324 detects that the fan is missing due to the continuously low voltage that follows.

The input signal of FIG. 6 also illustrates that the temporary reductions in voltage at the input 322 that are being counted by the microcontroller 332 continue during the high state, such as at temporary reduction 410", and during the low states when the secondary voltage is present at the input 322, such as temporary reductions 412" and 414". Furthermore, false temporary reductions due to residual noise during the low states of the PWM where PWM frequency is higher than the frequency of the temporary reductions, such as shown in FIG. 7, is also eliminated since the rotational sensor is continuously powered. Accordingly, the microcontroller 332 counts the temporary reductions for all true output pulses to more accurately detect the rotational speed.

The various embodiments discussed herein have included a microcontroller. An example of such a microcontroller is the ATmega 128 manufactured by Atmel. However, it will be appreciated that such a control circuit may include other devices besides a microcontroller integrated circuit. Furthermore, various embodiments discussed herein have included a FET switched on and off by a bi-polar transistor to provide a pulse width modulation voltage. It will be appreciated that other circuitry for producing the pulse width modulation is also applicable.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of detecting operational information about a DC fan of a device where the DC fan is powered by pulse width modulation and produces an output pulse in proportion to rotational speed, comprising:
    providing a pulse width modulated voltage to the DC fan and providing a voltage to an input of a control circuit when the DC fan is present in the device;
    producing a temporary reduction in the voltage to the input of the control circuit upon receiving the output pulse from the DC fan when present;
    holding the input of the control circuit at a low voltage when the DC fan is not present;
    detecting through the control circuit that the DC fan is not present in the device when the input of the control circuit is continuously at the low voltage; and
    detecting the rotational speed of the DC fan when present in the device through the control circuit from the number of temporary reductions in the voltage per unit of time at the input of the control circuit.

2. The method of claim 1, wherein the voltage at the input is the pulse width modulated voltage.

3. The method of claim 1, wherein the voltage at input is a secondary voltage less than the peak of the pulse width modulated voltage.

4. The method of claim 1, wherein holding the input at a low voltage comprises providing a pull down resistor between the input of the control circuit and ground.

5. The method of claim 4, wherein the pull down resistor is at least two orders of magnitude greater in resistance than a pull up resistor of the DC fan electrically connected between a source of the pulse width modulated voltage and a node joining the input of the control circuit and an electrode of a transistor, and wherein producing the temporary reduction in the voltage at the input comprises turning the transistor on by the output pulse to draw current through the pull up resistor.

6. The method of claim 1, wherein providing a pulse width modulated voltage comprises switching a FET connected to a DC voltage source on and off.

7. A method of detecting operational information about a DC fan of a device where the DC fan is powered by pulse width modulation and produces an output pulse in proportion to rotational speed, comprising:
    providing a pulse width modulated voltage and a secondary voltage to the DC fan, wherein the secondary voltage is less than a peak of the pulse width modulated voltage;
    providing a voltage to the input of the control circuit;
    producing temporary reduction in the voltage to the input of the control circuit upon receiving the output pulse from the DC fan during each period of time that the pulse width modulated voltage is high and during each period of time that the pulse width modulated voltage is low; and
    detecting the rotational speed of the DC fan through the control circuit from the number of temporary reductions per unit of time in the voltage at the input of the control circuit.

8. The method of claim 7, wherein the voltage at the input is the secondary voltage.

9. The method of claim 7, wherein the voltage at the input is the secondary voltage in parallel with the pulse width modulated voltage.

10. The method of claim 9, wherein detecting the rotational speed of the DC fan through the control circuit from the number of temporary reductions per unit of time at the input of the control circuit comprises detecting the rotational speed through the control circuit from the number of temporary reductions in the pulse width modulated voltage when in the high state and the temporary reductions in the secondary voltage when the pulse width modulated voltage is in the low state per unit of time at the input of the control circuit.

11. The method of claim 7, wherein providing a secondary voltage comprises providing a DC voltage source in parallel with a source of the pulse width modulated voltage.

12. The method of claim 11, wherein a pull up resistor is electrically connected between the parallel combination of the DC voltage source and the source of the pulse width modulated voltage and a node at the input of the control circuit and an electrode of a transistor, and wherein producing a temporary reduction comprises turning on the transistor with the output pulse to pull current through the pull up resistor to provide the temporary reduction at the input of the control circuit.

13. The method of claim 7, wherein providing a pulse width modulated voltage comprises switching a FET connected to a DC voltage source on and off.

14. A circuit for detecting operational information about a DC fan of a device where the DC fan is powered by pulse width modulation and produces an output pulse in proportion to rotational speed, comprising:

a transistor operatively coupled to receive the output pulse;

a controller having an input joined at a node with an electrode of the transistor, the controller being configured to detect the presence of the fan based on the input receiving a continuously low voltage or other voltage;

a pull up resistor that is electrically connected to the node and that provides a voltage drop to the input upon the transistor conducting in response to the output pulse;

a pulse width modulated power supply electrically connected to the DC fan and a voltage source electrically connected to the pull up resistor opposite the node; and a pull down resistor that is electrically connected between the node and ground and that provides the continuously low voltage at the input upon the pull up resistor being disconnected from the node.

15. The circuit of claim 14, wherein the voltage source is the pulse width modulated power supply.

16. The circuit of claim 14, wherein the voltage source is a secondary power supply producing a voltage less than the peak of the pulse width modulated power supply.

17. The circuit of claim 14, wherein the pull up resistor and the transistor are integral with the DC fan, and wherein the pull up resistor is disconnected from the node upon removal of the DC fan.

18. The circuit of claim 14, wherein the pull down resistor is more than two orders of magnitude greater in resistance than the pull up resistance.

19. The circuit of claim 14, wherein the pulse width modulated power supply comprises a DC voltage source coupled to a FET that is turned on and off to output the pulse width modulated voltage.

20. The circuit of claim 19, wherein the controller has an output that is coupled to a second transistor and the second transistor is coupled to the FET, and wherein the controller output switches the second transistor on and off to switch the FET on and off.

21. The circuit of claim 14, wherein the output pulse is generated by a Hall effect sensor integral to the DC fan.

22. A circuit for detecting operational information about a DC fan of a device where the DC fan is powered by pulse width modulation and produces an output pulse in proportion to rotational speed, comprising:

a transistor operatively coupled to receive the output pulse;

a controller having an input joined at a node with an electrode of the transistor, the controller being configured to detect the speed of the fan based on the input receiving a voltage having temporary reductions corresponding to the output pulse during periods when the pulse width modulated voltage is high and low;

a pull up resistor that is electrically connected to the node and that provides a voltage drop to the input to provide the temporary reduction upon the transistor conducting in response to the output pulse;

a pulse width modulated power supply electrically connected to the DC fan and a voltage source electrically connected to the pull up resistor opposite the node; and a secondary voltage supply electrically coupled to the DC fan and to the pull up resistor opposite the node, wherein the secondary voltage supply provides a secondary voltage that is less than pulse width modulated voltage when high.

23. The circuit of claim 22, wherein the voltage source is the secondary voltage supply.

24. The circuit of claim 22, wherein the voltage source is the pulse width modulated power supply in parallel with the secondary voltage supply.

25. The circuit of claim 22, further comprising a diode connected between the secondary voltage supply and the DC fan to allow current to pass from the secondary voltage supply to the DC fan but to prevent current from passing from the pulse width modulated power supply to the secondary voltage supply.

26. The circuit of claim 22, further comprising a pull down resistor that is electrically connected between the node and ground and that provides a continuously low voltage at the input upon the pull up resistor being disconnected from the node, and wherein the controller detects the presence of the fan based on the input receiving a continuously low voltage or other voltage.

27. The circuit of claim 22, wherein the pull up resistor and the transistor are integral with the DC fan.

28. The circuit of claim 22, wherein the pulse width modulated power supply comprises a DC voltage source coupled to a FET that is turned on and off to output the pulse width modulated voltage.

29. The circuit of claim 28, wherein the controller has an output that is coupled to a second transistor and the second transistor is coupled to the FET, and wherein the controller output switches the second transistor on and off to switch the FET on and off.

30. The circuit of claim 22, wherein the output pulse is generated by a Hall effect sensor integral to the DC fan.

* * * * *